United States Patent
Till et al.

(10) Patent No.: US 8,151,544 B2
(45) Date of Patent: Apr. 10, 2012

(54) BOTTLE FILLING PLANT CONFIGURED TO FILL BLOW MOLDED BOTTLES WITH A LIQUID BEVERAGE FILLING PRODUCT AND A TREATMENT MACHINE FOR BOTTLES OR SIMILAR CONTAINERS

(75) Inventors: Volker Till, Hofheim am Taunus (DE); Thomas Stolte, Bad Kreuznach (DE)

(73) Assignee: KHS AG, Dortmund (DE)

( * ) Notice: Subject to any disclaimer, the term of this patent is extended or adjusted under 35 U.S.C. 154(b) by 308 days.

(21) Appl. No.: 12/356,261

(22) Filed: Jan. 20, 2009

(65) Prior Publication Data

US 2009/0183798 A1    Jul. 23, 2009

Related U.S. Application Data

(63) Continuation-in-part of application No. PCT/EP2007/006308, filed on Jul. 17, 2007.

(30) Foreign Application Priority Data

Jul. 20, 2006 (DE) .................. 10 2006 033 512

(51) Int. Cl.
*B65B 57/00* (2006.01)
(52) U.S. Cl. .................. 53/77; 53/167; 53/201
(58) Field of Classification Search ............... 53/77, 76, 53/167, 201, 282, 69, 52
See application file for complete search history.

(56) References Cited

U.S. PATENT DOCUMENTS

| | | | |
|---|---|---|---|
| 7,121,062 B2 * | 10/2006 | Till | 53/167 |
| 2005/0011730 A1 | 1/2005 | Wittmann et al. | |
| 2005/0045244 A1 * | 3/2005 | Hartness et al. | 141/144 |

FOREIGN PATENT DOCUMENTS

| | | |
|---|---|---|
| DE | 359 296 | 9/1922 |
| DE | 6 802 685 | 1/1969 |
| DE | 198 29 176 | 1/2000 |
| DE | 202 03 913 | 7/2003 |
| EP | 1 072 511 | 1/2001 |

OTHER PUBLICATIONS

International Search Report PCT/EP2007/006308 and English translation thereof.

* cited by examiner

*Primary Examiner* — Sameh H. Tawfik
(74) *Attorney, Agent, or Firm* — Nils H. Ljungman & Associates (57) ABSTRACT

A bottle filling plant configured to fill blow molded bottles with a liquid beverage filling product and a treatment machine for bottles or similar containers. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

3 Claims, 6 Drawing Sheets

BOTTLE FILLING PLANT CONFIGURED TO FILL BLOW MOLDED BOTTLES WITH A LIQUID BEVERAGE FILLING PRODUCT AND A TREATMENT MACHINE FOR BOTTLES OR SIMILAR CONTAINERS

CONTINUING APPLICATION DATA

This application is a Continuation-In-Part application of International Patent Application No. PCT/EP2007/006308, filed on Jul. 17, 2007, which claims priority from Federal Republic of Germany Patent Application No. 10 2006 033 512.0, filed on Jul. 20, 2006. International Patent Application No. PCT/EP2007/006308 was pending as of the filing date of this application. The United States was an elected state in International Patent Application No. PCT/EP2007/006308.

BACKGROUND

1. Technical Field

The present application relates to a bottle filling plant configured to fill blow molded bottles with a liquid beverage filling product, and a treatment machine for bottles or similar containers, with at least one transport component. At least one treatment station is formed on this transport component for the treatment of the containers on a movement path of the transport component between a container inlet and a container outlet and with functional components on the transport component and/or on a machine frame that does not move with the transport component.

2. Background Information

Background information is for informational purposes only and does not necessarily admit that subsequently mentioned information and publications are prior art.

Some treatment machines such as, for example, fillers, rinsers, closers or cappers, labeling machines, etc., employ a rotary construction, in which there are a plurality of treatment stations that can be driven in rotation around a vertical machine axis, which treatment stations are adapted to the type of processing in question and interact with the containers to be treated, for example in the form of components that hold or support the containers. Additional functional components that interact with the containers, including the functional components that guide the containers, are frequently provided on the machine frame outside the rotor and do not rotate with the rotor.

To achieve the required or desired operational reliability, including at high rates of operation (number of containers or bottles processed or treated per unit of time), a stable realization of the overall treatment machine and thereby including a stable realization of the functional components and other parts of the machine that interact with the containers is essential. When containers become jammed between the revolving rotor or the functional components located on it or between other areas of the rotor and external functional components that do not rotate with the rotor, however, the result can be damage to the treatment machine.

Problems of this type occur often to a minor extent when working with glass containers because such containers shatter relatively easily and the pieces of broken glass that are formed as a result are generally small and can therefore fall downward out of the treatment machine in question without causing any problems. On the other hand, metal or plastic containers, e.g. PET containers, cause greater problems in the event of a failure or malfunction because unlike glass containers they do not shatter, but are often dented or deformed. Such dented or deformed containers still have significant outside dimensions and can therefore frequently not fall out of the hazardous or movement area through any existing openings or spaces in the machine. Instead, they remain in the machine and can cause significant damage, for example if a container becomes jammed between a container receptacle of a treatment station of the rotor and an external container guide. As a result of the forces that occur at a high speed of rotation of the respective rotor, this can then lead not only to damage that is limited locally to the container receptacle affected, but also to extensive damage to the entire machine, for example to neighboring receptacles and to the entire container guide system.

OBJECT OR OBJECTS

An object of the present application is to indicate a treatment machine that eliminates, restricts, and/or minimizes these disadvantages. The present application teaches that this object can be accomplished by the treatment machine for bottles or similar containers, with at least one transport component. At least one treatment station is formed on this transport component for the treatment of the containers on a movement path of the transport component between a container inlet and a container outlet. Functional components are located on the transport component and/or on a machine frame that does not move with the transport component. At least one functional component, against which containers or parts of containers are in contact or can come in contact in the event of a malfunction, is realized in the form of a detachable functional component for an at least partial detachment from the transport component or from the machine frame in the event of the application of a force that exceeds a detachment force.

SUMMARY

In the treatment machine according to the present application, at least one functional component against which containers come into contact at least in the event of a malfunction or with which such containers can come into contact, is realized detachably so that during normal operation this functional component is held with the required or desired strength on the transport component or on the part of the machine frame that does not move with the transport component, but in the event of a malfunction comes detached with at least one segment of the transport component or machine frame that interacts with the container in question. Each functional component realized in this manner is designated a "detachable functional component" below.

In at least one possible embodiment according to the present application, this at least one detachable functional component is a functional component is one that also interacts with the containers during normal operation, e.g. one that holds, supports and/or guides them.

In one possible embodiment according to the present application, damage to the treatment machine caused by loads that occur in the event of a malfunction is effectively avoided, restricted, and/or minimized.

In one possible embodiment, the separation occurs at a predetermined breaking point, whereby this predetermined breaking point is realized either in the detachable functional component or a part of the detachable functional component itself by a reduction of the material thickness, and/or in a connecting component which connects the detachable functional component or the segment of the functional component that can be detached in the event of a failure or malfunction with the transport component or with the machine framework.

When the connection that is detachable in the event of a failure or malfunction is realized with the use of at least one predetermined breaking point, an accurate positioning in normal operation is reliably achieved for the detachable functional component. In at least one possible embodiment according to the present application, reduction of the repair costs in the event of a failure of malfunction is essentially restricted and/or minimized by reducing the number of damaged assemblies and components, and the ability to replace damaged assemblies and components quickly is promoted. The individual predetermined breaking point is realized in the functional component itself, promoting savings of material and weight.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Developments are described according to the present application. The present application is explained in greater detail below with reference to the possible embodiments illustrated in the accompanying examples, in which.

DESCRIPTION OF EMBODIMENT OR EMBODIMENTS

Figure 1:
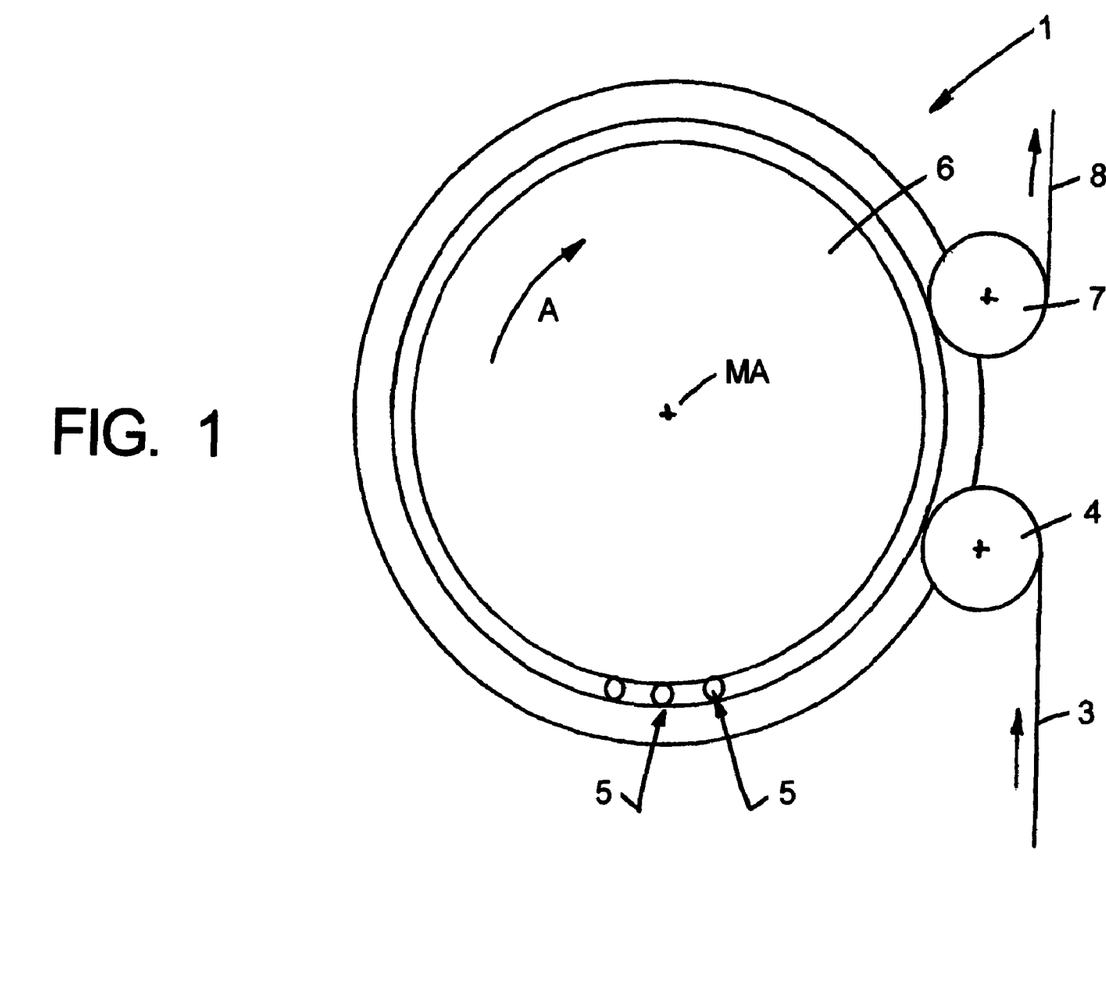
FIG. 1 is a schematic illustration showing a plan view of a container treatment machine that employs a rotary construction in the form of a filling machine for the filling of bottles or similar containers with a liquid.

The container treatment machine which is designated 1 in general in the figures, and in the illustrated embodiment is in the form of a filling machine, is used for the treatment, i.e. for the filling of containers 2 in the form of bottles with a liquid. The containers 2, which are provided in the vicinity of their container mouth 2.1 with a radially projecting container or neck flange 2.2, are fed in the upright position, i.e. with their container axis oriented in the vertical direction, via a conveyor 3 to a container inlet formed by an inlet star wheel 4 and are transferred individually from the transport star wheel 4 individually to a treatment station 5 which, together with a plurality of similar treatment stations 5 on the periphery of a rotor 6 which is driven in rotation around a vertical machine axis in the direction indicated by the arrow A. The treated containers 2, i.e. the filled containers 2, are taken from the treatment stations 5 at an outlet star wheel 7 which forms the container outlet and transferred to a conveyor 8 to be transported away. In the illustrated embodiment, the containers 2 are made of plastic, e.g. PET.

Figure 2:
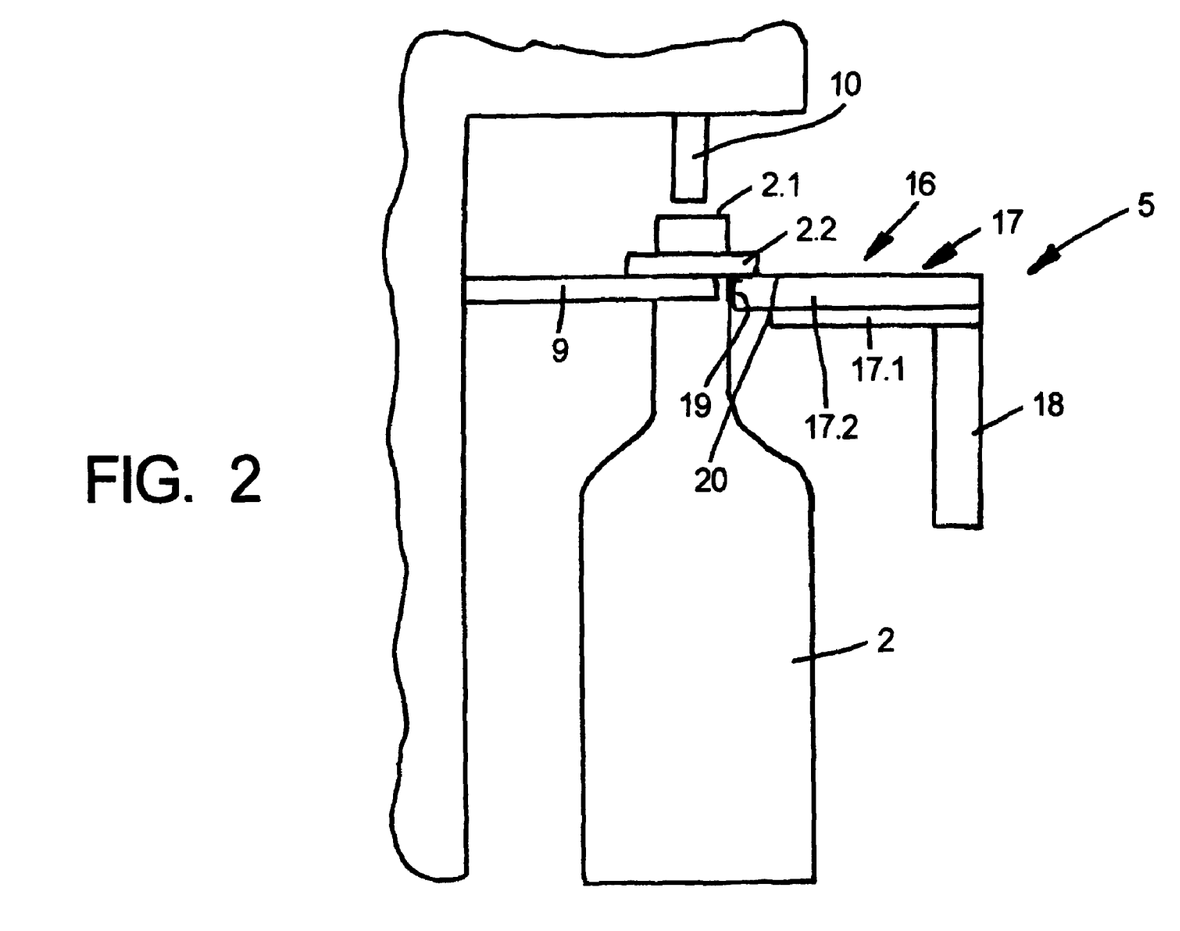
FIG. 2 is a schematic illustration showing one of the treatment stations formed on a rotating rotor of the treatment machine illustrated in FIG. 1, together with a container in the form of a bottle and an external container guide.

Each treatment station 5 has, among other things, a container carrier 9 on which the individual container 2 is held in a suspended position during the treatment over the angular area of the rotational movement of the rotor 6 between the container inlet and the container outlet, and in one possible embodiment when the treatment machine 1 is realized in the form of a filling machine, so that each container 2 is located with its container mouth 2.1 underneath an additional functional component of the treatment station 5, namely underneath a filling component 10.

Figure 3:
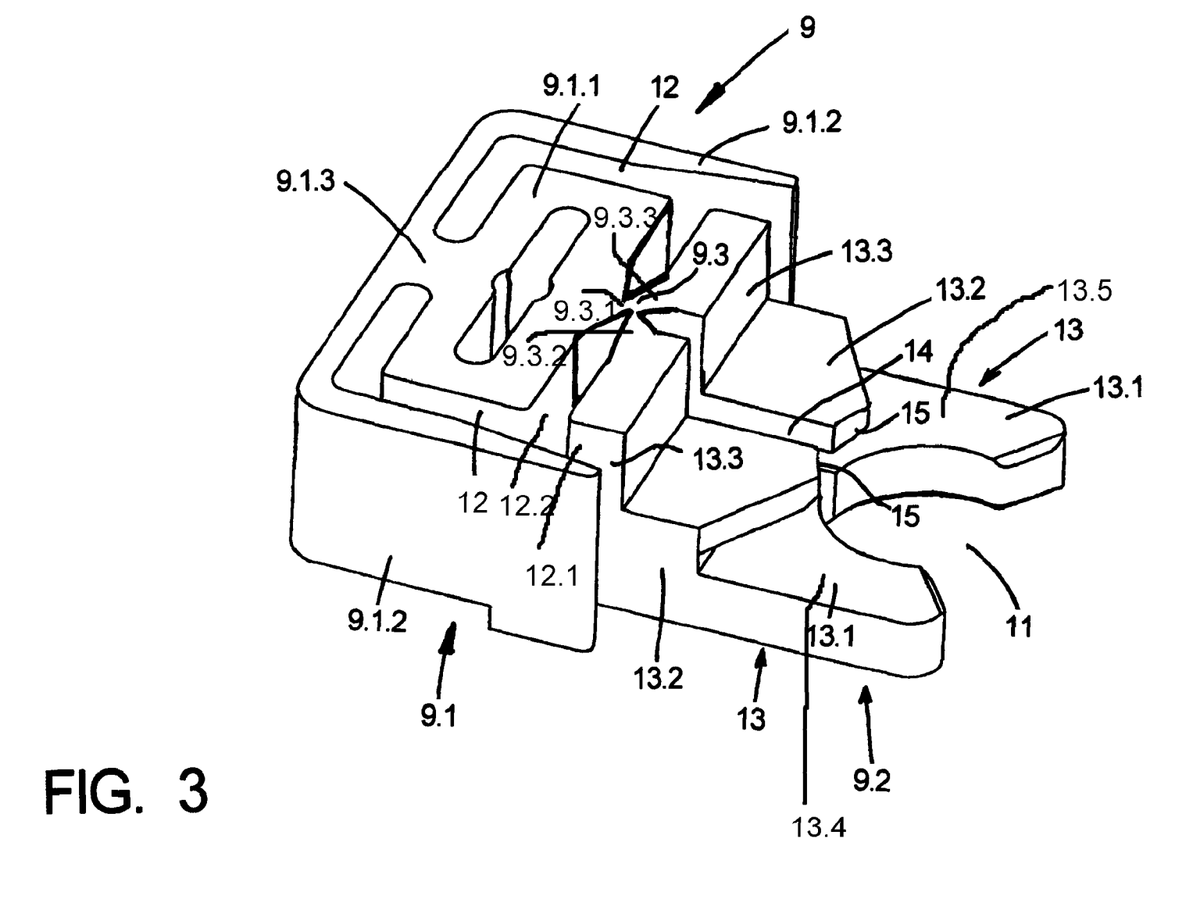
FIG. 3 is a detail in perspective showing the container receptacle or the container carrier of the treatment station illustrated in FIG. 2.

Each container carrier 9 is fastened in a suitable manner to the rotor 6 with a segment 9.1 which is radially inboard with reference to the vertical machine axis MA and forms, on a segment 9.2 which is radially outboard with reference to the vertical machine axis MA, a receptacle opening 11 which is open toward the radial outside with reference to the machine axis MA and on which the individual container 2 is held with its flange 2.2 in contact with the top of the segment 9.2. Each container carrier 9 is manufactured with its two segments 9.1 and 9.2 in a single piece from a suitable material, for example in the form of a molding from a metal material or plastic.

In the illustrated possible embodiment, the segment 9.1 thereby forms a central, pad-like subsegment 9.1.1 which is used for the fastening (for example by threaded fasteners or clamps) of the container carrier 9 to the rotor 6, and two wall segments 9.1.2 which overlap the central subsegment 9.1.1 at some distance on two opposite sides and also on the reverse side facing away from the receptacle opening 11, but also a partial length which is continuous to the segment 9.1 or the subsegment 9.1.1. The wall segments 9.1.2 transition on the reverse side of each container carrier 9 via a web-like subsegment 9.1.3 into the subsegment 9.1.1, so that there are two open recesses 12 which are open on the top and bottom of the segment 9.1, which recesses extend, among other things, among the wall segments 9.1.2 between the wall segments and the subsegment 9.1.1. The web-like subsegment 9.1.3 is oriented with its longitudinal dimension parallel or virtually parallel to the axis of the receptacle opening 11 and thus, when the container carrier 9 is installed, parallel or virtually parallel to the machine axis MA.

On the front side of the subsegment 9.1.1 facing the receptacle opening 11, in the center, via a web 9.3 which is oriented with its longitudinal dimension in turn parallel or virtually parallel to the axis of the receptacle opening 11 and thus, when the container carrier 9 is installed, parallel or virtually parallel to the machine axis MA and in the illustrated possible embodiment extends over the full height of the container carrier 9, are the segment 9.2 and the connected fork arms 13 that form this segment and which, in the vicinity of their free ends, i.e. the ends that are farther from the segment 9.1, between them form the receptacle opening 11 and are separated from each other by a slot-shaped recess 14. This recess extends between the receptacle opening 11 and the web 9.3, and in one possible embodiment in a plane which, when the container carrier 9 is installed, is a vertical plane radial to the machine axis MA.

As illustrated in FIG. 3, the two fork arms 13 are flat or essentially flat on their underside and are each realized in a plurality of steps on their upper side, and in one possible embodiment with a subsegment 13.1 which borders the receptacle opening 11 and has a small thickness, with a sub-segment 13.2 contiguous to it with a thickness which is greater than that of the subsegment 13.1 and with a subsegment 13.3 contiguous to the subsegment 13.1 which has a thickness which is equal to or approximately equal to the thickness of the container carrier 9 in segment 9.1. The sub-segments 13.3 each transition via the web 9.3 into the sub-segment 9.1.1. The stepped transitions between the subsegments 13.1 and 13.2 form contact surfaces 15 for the peripheral surface of the respective container flange 2.2 which is supported on the upper side of the subsegments 13.1 in the vicinity of the edge of the receptacle opening 11.

The web 9.3 is realized so that the recess 12 also extends between the subsegment 9.1.1 and the segment 9.2 or the respective subsegment 13.3 to the web 9.3. The width of the web 8.3 is selected so that this web forms a predetermined breaking point between the segment 9.1 and the segment 9.2 or between the segment 9.1 and each fork arm 13. Taking into consideration the characteristics of the material used for the manufacture of the container carrier 9, the web 9.3 is realized so that the container carrier 9 during normal operation has the necessary or desired strength so that in the event of potential malfunctions which cause an excessive application of force to a container carrier 9 or its fork arms 13, in one possible embodiment in the peripheral direction of the rotor 6, the break will occur at the predetermined breaking point formed by the web 9.3 and thus a separation of at least one fork arm 13 from the subsegment 9.1.

As shown in FIG. 3, the break could occur at one of three specific break points. The first break point 9.3.1 when fractured would separate the entire fork-arm 13 from sub-segment 9.1.1. A second break point 9.3.3 when fractured would separate only the left side of the fork-arm 13.5 from sub-segment 9.1.1. Finally, a third break point 9.3.2 when fractured would separate the right side of the fork-arm 13.4 from sub-segment 9.1.1.

In one possible embodiment, to increase the effectiveness of the predetermined breaking point formed by the web 9.1, the recesses 13 and 14 are realized so that in the vicinity of the web 9.3 they narrow in a tapered fashion to create a notch effect. The material of which the fork-arm 13 is constructed must be brittle enough for a fracture to occur when a misaligned container or malfunction put stress on the fork-arm 13.

In addition to a brittle construction material making up the entire fork-arm 13 or specifically the web 9.3, the recess 12.1a and b between the sub-segment of the fork-arm 13.2 a and b and the inside of the wall segment 9.1.2 must be large enough to provide sufficient room for the flexing of the entire fork 9.2 thereby permitting a fracture at break point 9.3.1 precipitating the separation of the entire fork 9.2 from the container carrier 9. The recesses 12.1a between the sub-segment of the fork-arm 13.2a and the inside of the wall segment 9.1.2 and 12.2 between the sub-segment 9.1.1 and the back of the fork-arm 13 as well as the recess 14 between the fork-arms 13.4 and 13.5 must be large enough to provide sufficient room for the flexing of the right side of the fork-arm 3.4 thereby permitting a fracture at break point 9.3.2 precipitating the separation of the right side of the fork-arm 13.4 from the container carrier 9. Finally, the recesses 12.1b between the sub-segment of the fork-arm 13.2b and the inside of the wall segment 9.1.2 and 12.2 between the sub-segment 9.1.1 and the back of the fork-arm 13 as well as the recess 14 between the fork-arms 13.4 and 13.5 must be large enough to provide sufficient room for the flexing of the left side of the fork-arm 13.5 thereby permitting a fracture at break point 9.3 precipitating the division of the left side of the fork-arm 13.5 from the container carrier 9.

Malfunctions that can lead to an increased application of force to the container carriers 9 include, for example, the jamming of the containers 2 in the container inlet or container outlet as well as a jamming of the containers 2 between the individual container carrier 9 and an external guide 16 in the angular area of the rotational movement of the rotor 6 between the container inlet and the container outlet. The external guide 16 which does not rotate with the rotor 6 essentially comprises a guide component 17 which is connected by means of a plurality of holders 18 with the machine frame (not shown) of the treatment machine 1.

Figure 4:
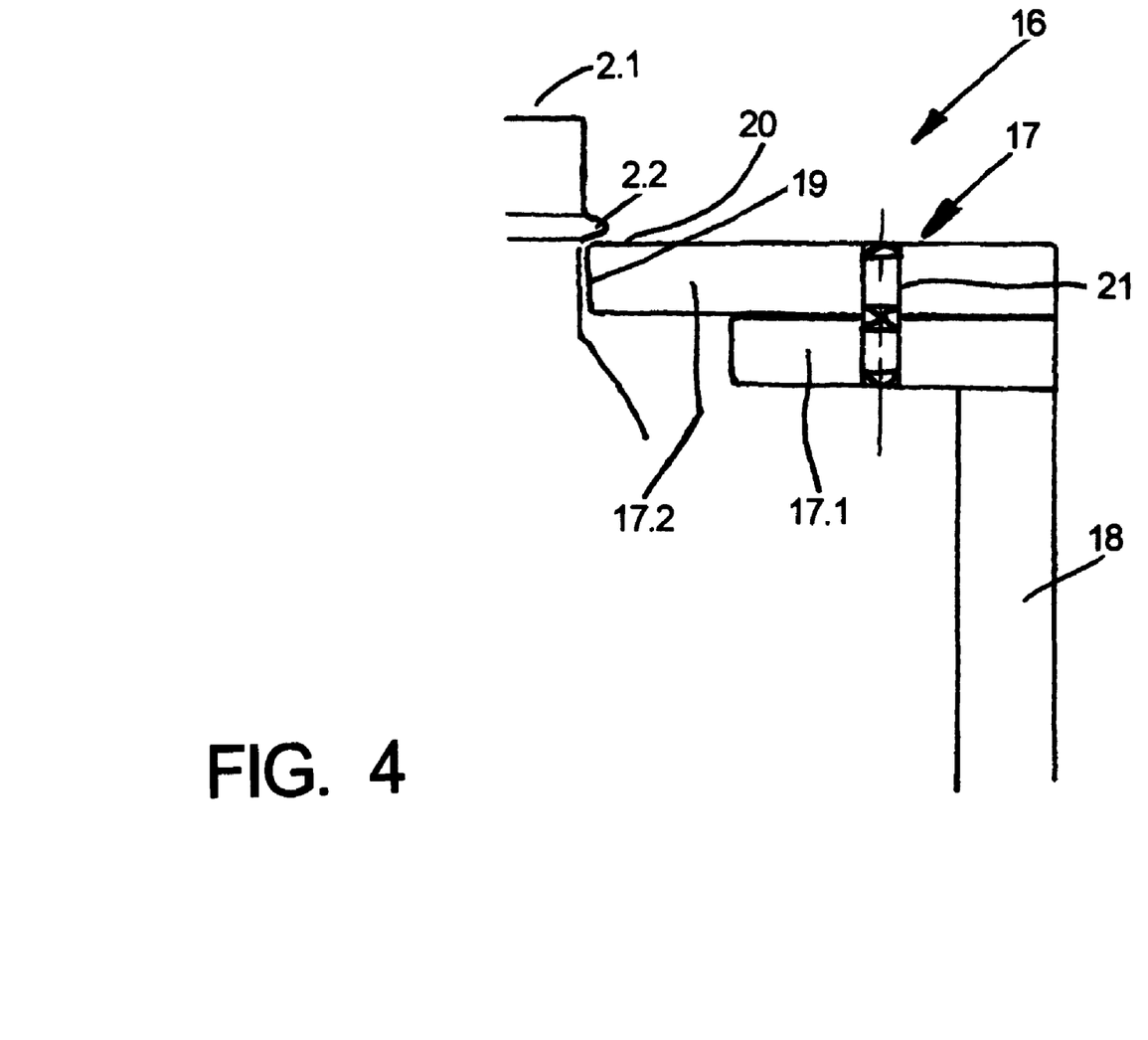
FIG. 4 is a simplified illustration, in section, of the external container guide.

As illustrated in FIG. 4, in the illustrated possible embodiment the guide component 17 is realized in two parts, and comprises a ring-shaped segment 17.1 shown in the bottom in FIG. 4, on which holders 18 are provided and of an upper ring-shaped segment 17.2 in FIG. 4 which, in the illustrated embodiment, is also realized in the form of a flat ring which is oriented with its surfaces in planes perpendicular or virtually perpendicular to the machine axis MA. On the inside, the segment 17.2 forms an encircling circular ring-shaped guide surface 19 concentric to the machine axis MA for the containers 2 on their container outside surface below the flange 2.2. With the upper side, the segment 17.2 forms an additional guide surface 20 for the underside of the flange 2.2 of each container. The segment 17.2 is connected by means of shearing bolts 21 with the segment 17.1 below it. These shearing bolts 21 are realized so that they form a predetermined breaking point, so that when a force is exerted on the segment 17.1 which, for example as a result of a malfunction, exceeds the forces that occur in normal operation, the rupture and/or shearing of the shearing bolts 21 results in a detachment of the segment 17.2 from the segment 17.1. Malfunctions of this type include, for example, a jamming of the containers 2 in the container inlet or in the container outlet between the container guide 16 and another, in one possible embodiment circulating functional component, for example a container carrier 8 of the treatment machine 1 and/or a jamming of one or more containers 2 between the container guide 16 and the associated container carrier 9 in the angular area of the rotational movement of the rotor 6 between the container inlet and the container outlet.

The segment 17.2 is in one possible embodiment realized in sections, i.e. it comprises a plurality of segments that are contiguous to one another in the direction of rotation A of the rotor 6 and are each realized in the form of a circular arc, and are each held on the segment 17.1 by means of at least one shearing bolt 21.

The present application was described above on the basis of possible embodiments. It goes without saying that numerous modifications and variations are possible without thereby going beyond the teaching of the present application.

For example, it is possible in one possible embodiment to realize the predetermined breaking points on the receptacles 9 and/or on the container guide 16 in a manner that is different from the one described above and/or to provide such predetermined breaking points on other functional components that interact with the containers 2, for example on the filler tubes that are introduced into the containers during the filling process, on parts of filling components that are in sealed contact with the containers 2 during a filling process, etc. In any case, however, the predetermined breaking points must be realized or should be realized so that by means of these predetermined breaking points, the forces and/or moments that occur during normal operation can be transmitted, and there is a separation in the vicinity of the respective predetermined breaking point in the event of an elevated load caused by a malfunction.

It is further within the teaching of this present application to provide predetermined breaking points according to the present application on other container treatment machines that do not have outboard, non-circulating guide components 17. In this manner it becomes possible, for example, to significantly reduce the effects of operational malfunctions and disruptions during which plastic containers become jammed in the inlet or outlet star wheels.

It is also within the teaching of this present application to realize the functional components or the components including the functional components so that the functional components are fixed in their desired positions by locking components. It is thereby further provided that the functional components, as a result of the action of these locking components, can reliably absorb the forces that occur during normal operation without being displaced, although they can give in the event of a malfunction to prevent, restrict, and/or minimize major damage.

In the context of repairing the equipment or clearing the malfunction, the displaced functional component can be returned to its specified position, where it is correctly repositioned and locked in place by the locking component.

Figure 5:
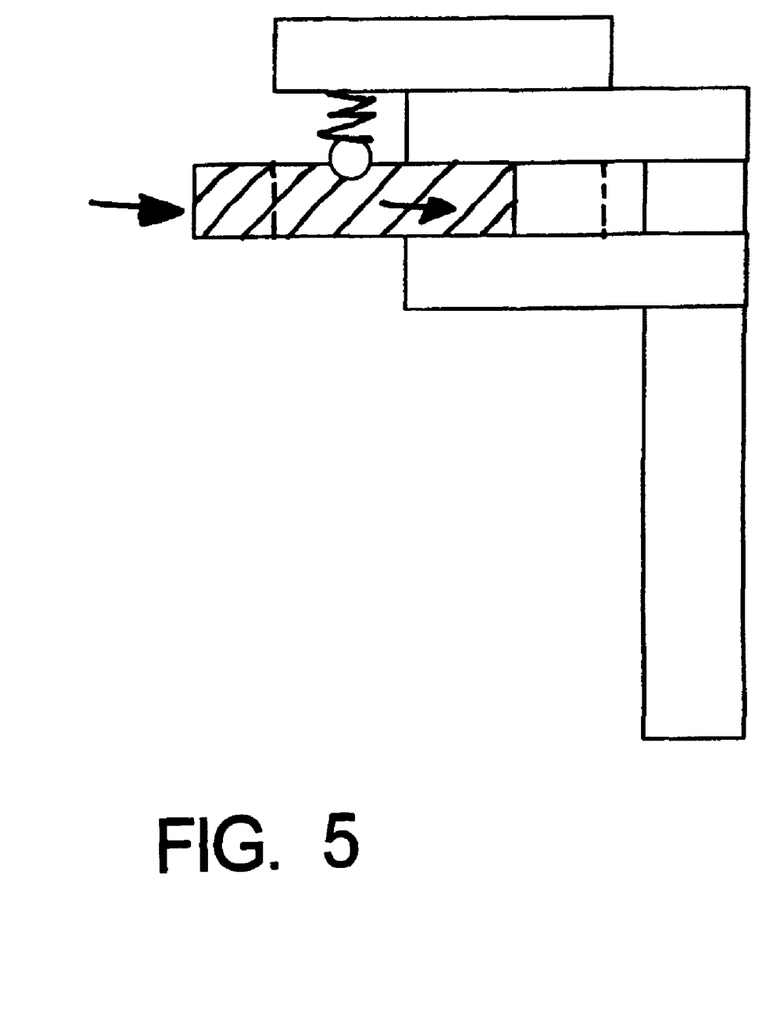
FIG. 5 is a simplified sectional illustration of an additional possible embodiment of an external container guide.

These locking components can be spring-loaded components of the type familiar to a technician skilled in the art, and as illustrated in a simplified manner in FIG. 5. Likewise, they can be components of the type that are at least partly elastically deformable.

Figure 6:
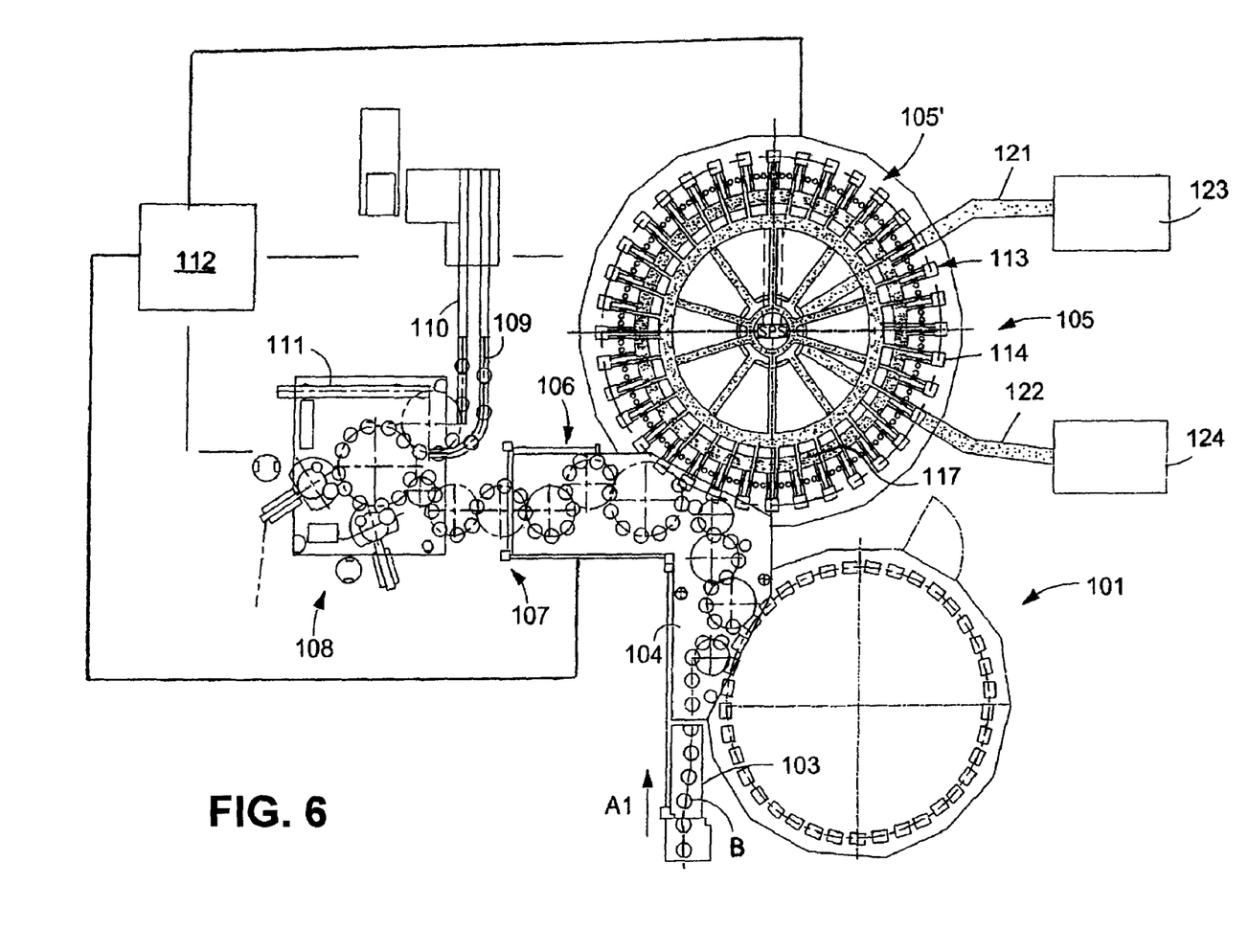
FIG. 6 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 6 shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 6, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

In one possible embodiment according to the present application, the use of locking components allows the functional components to be very easily replaced, in which case, in one possible configuration of the present application, they can even be replaced without the use of tools after the occurrence of a malfunction.

This present application relates to a treatment machine for bottles or similar containers, with at least one transport component with at least one treatment station formed on this transport component for the treatment of the containers on a movement path of the transport component between a container inlet and a container outlet and with functional components for the performance of the treatment on the transport component and/or on a machine frame that does not move with the transport component.

One feature or aspect of an embodiment is believed at the time if the filing of this patent application to possibly reside broadly in a treatment machine for bottles or similar containers 2, with at least one transport component 6 with at least one treatment station formed on this transport component for the treatment of the containers 2 on a movement path of the transport component 6 between a container inlet 4 and a container outlet 7 and with functional components on the transport component 6 and/or on a machine frame that does not move with the transport component 6, wherein at least one functional component against which containers 2 or parts of containers are or can come in contact in the event of a malfunction is realized in the form of a detachable functional component 9, 16 for an at least partial detachment from the transport component or from the machine frame in the event of the application of a force that exceeds a detachment force.

Another feature or aspect of an embodiment is believed at the time if the filing of this patent application to possibly reside broadly in the treatment machine, wherein at least one functional component, against which containers 2 or parts of containers come or can come into contact in the event of a malfunction, is positioned and fixed in its specified position under the action of at least one locking component.

Yet another feature or aspect of an embodiment is believed at the time if the filing of this patent application to possibly reside broadly in the treatment machine, wherein the at least one functional component and/or its receptacle is/are realized so that they can be displaced relative to each other or detached from each other in the event of a malfunction.

Still another feature or aspect of an embodiment is believed at the time if the filing of this patent application to possibly reside broadly in the treatment machine, wherein the detachable or displaceable functional component 9, 16 is one which also interacts with the containers 2 during normal operation of the machine.

A further feature or aspect of an embodiment is believed at the time if the filing of this patent application to possibly reside broadly in the treatment machine, wherein the at least one detachable or displaceable functional component 9, 16 or a segment 9.2, 17.2 of the detachable or displaceable functional component 9, 16 which interacts with containers 2 at least in the event of a malfunction is held on the transport component 6 or on the machine frame by means of at least one predetermined breaking point 9.3, 21 or at least one locking component.

Another feature or aspect of an embodiment is believed at the time if the filing of this patent application to possibly reside broadly in the treatment machine, wherein the detachable or displaceable functional component is a container carrier 9.

Yet another feature or aspect of an embodiment is believed at the time if the filing of this patent application to possibly reside broadly in the treatment machine, wherein the container carrier 9 is realized for a suspended position of the container 2 on a container flange 2.2.

Still another feature or aspect of an embodiment is believed at the time if the filing of this patent application to possibly reside broadly in the treatment machine, wherein the container carrier 9 comprises a first segment 9.1 connected with the transport component 6 and a second segment 9.2 that forms at least one receptacle 11 for a container 2, and that the predetermined breaking point 9.3 or the locking component is provided between these segments 9.1, 9.2.

A further feature or aspect of an embodiment is believed at the time if the filing of this patent application to possibly reside broadly in the treatment machine, wherein the second segment 9.2 of the container carrier 9 has two fork-like components or fork arms 13 that form the receptacle 11, and that the fork arms are connected with the first segment 9.1 of the container carrier 9 by means of at least of one predetermined breaking point 9.3 or at least one locking component.

Another feature or aspect of an embodiment is believed at the time if the filing of this patent application to possibly reside broadly in the treatment machine, wherein each fork arm is connected by means of its own predetermined breaking point 9.3 or by means of its own locking component with the first segment 9.1 of the container carrier 9.

Yet another feature or aspect of an embodiment is believed at the time if the filing of this patent application to possibly reside broadly in the treatment machine, wherein the at least one predetermined breaking point 9.3 is formed by a web-like material segment which is oriented with its longitudinal dimension in one possible embodiment in a vertical or approximately vertical direction.

Still another feature or aspect of an embodiment is believed at the time if the filing of this patent application to possibly reside broadly in the treatment machine, wherein the at least one predetermined breaking point 9.3 is formed by at least one recess 12, 14.

A further feature or aspect of an embodiment is believed at the time if the filing of this patent application to possibly reside broadly in the treatment machine, wherein at least one recess 12, 14 tapers in a wedge shape in the vicinity of the predetermined breaking point 9.3.

Another feature or aspect of an embodiment is believed at the time if the filing of this patent application to possibly reside broadly in the treatment machine, wherein a plurality of treatment stations 5, each of which with at least one detachable functional component 9, are provided on the transport component 6.

Yet another feature or aspect of an embodiment is believed at the time if the filing of this patent application to possibly reside broadly in the treatment machine, wherein the at least one predetermined breaking point is formed by a reduced material area or material web 9.3 of the functional component which is detachable at least in subsegments 9.1.1, 13 on both sides of the predetermined breaking point and is realized in one piece with it.

Still another feature or aspect of an embodiment is believed at the time if the filing of this patent application to possibly reside broadly in the treatment machine, wherein the predetermined breaking point is formed by at least one shearable component which connects the detachable functional component with the transport component 6 or the machine frame, such as a shearing bolt 21, for example.

A further feature or aspect of an embodiment is believed at the time if the filing of this patent application to possibly reside broadly in the treatment machine, wherein the detachable or displaceable functional component is a container guide 16 which is not moved with the transport component 6 or a segment 17.2 of this container guide 16 that forms at least one container guide surface 19, 20.

Another feature or aspect of an embodiment is believed at the time if the filing of this patent application to possibly reside broadly in the treatment machine, wherein the container guide 16 has a plurality of segments 17.2 which are contiguous to one another in the transport direction and each of which forms at least one container guide surface 19, 20, and that each segment 17.2 is realized so that it can be detached or displaced in the event of a malfunction.

Yet another feature or aspect of an embodiment is believed at the time if the filing of this patent application to possibly reside broadly in the treatment machine, wherein the segment 17.2 that forms the at least one container guide surface 19, 2 or the subsegments that form the at least one container guide surface 19, 20 are each held by means of at least one shearing bolt 21.

Still another feature or aspect of an embodiment is believed at the time if the filing of this patent application to possibly reside broadly in the treatment machine, wherein the transport component is a rotor 6 which can be driven in rotation around a vertical machine axis with a plurality of treatment stations 5 on the rotor periphery.

A further feature or aspect of an embodiment is believed at the time if the filing of this patent application to possibly reside broadly in the treatment machine, wherein the container guide 16 surrounds the rotor 6 over at least a portion of its length Another feature or aspect of an embodiment is believed at the time if the filing of this patent application to possibly reside broadly in the treatment machine, wherein its realization is in the form of a filling machine.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . ." may possibly not be used or useable in any one or more embodiments of the application.

The sentence immediately above relates to patents, published patent applications and other documents either incorporated by reference or not incorporated by reference.

All of the patents, patent applications or patent publications, which were cited in the International Search Report, and/or cited elsewhere are hereby incorporated by reference as if set forth in their entirety herein as follows: EP 1,072,511, having the title "WEIGHT FILLING MACHINE FOR BOTTLES," published on Jan. 31, 2001; and US 2005/0011730, having the title "CONVEYOR," published on Jan. 20, 2005.

All of the patents, patent applications or patent publications, which were cited in the Office Action, and/or cited elsewhere are hereby incorporated by reference as if set forth in their entirety herein as follows: DE 26 25 237, having the following English translation of the German title "feed device for printed sheets," published on Feb. 3, 1977; DD 285 324, having the following German title "VORRICHTUNG ZUM STEUERN VON FOERDERELEMENTEN FUER AUS FLACHEN GEGENSTAENDEN, INSBESONDERE DRUCKBOGEN, BESTEHENDE STAPEL," published on Dec. 12, 1990; and DE 42 00 186, having the following English translation of the German title "sheet extracting device with a cassette for receiving a stack of sheets," published on Jul. 15, 1993.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 033 512.0, filed on Jul. 20, 2007, having inventors Volker TILL and Thomas STOLTE, and DE-OS 10 2006 033 512.0 and DE-PS 10 2006 033 512.0, and International Application No. PCT/EP2007/006308, filed on Jul. 17, 2007, having WIPO Publication No. WO 2008/009410 and inventors Volker TILL and Thomas STOLTE, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/EP2007/006308 and German Patent Application 10 2006 033 512.0 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/006308 and DE 10 2006 033 512.0 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 Treatment machine
2 Container
2.1 Container mouth
2.2 Container flange
3 Conveyor
4 Inlet star wheel
5 Treatment station
6 Rotor
7 Outlet star wheel
8 Conveyor
9 Container carrier
9.1, 9.2 Segment of the container carrier
9.1.1 Subsegment
9.1.2 Wall segment
10 Filling component
11 Receptacle opening on the container carrier 9
12 Recess
13 Fork arm
13.1, 13.2, 13.3 Segment of the fork arm 13
14 Slot-shaped recess between the fork arms 13
15 Contact surface
16 Container guide
17 Guide component 17.1, 17.2 Segment of the guide component 17
18 Holder
19, 20 Guide surface
21 Shearing bolt
A Direction of rotation of the rotor 6
MA Machine axis

What is claimed is:

1. A container treatment machine configured to treat bottles or similar containers, such as blow-molded containers, said treatment machine comprising:
   a holding and guiding arrangement being configured to hold and guide containers through said treatment machine;
   said holding and guiding arrangement comprising at least one detachable portion being configured to break away and at least partially detach from said holding and guiding arrangement upon a force sufficient to break away and at least partially detach said at least one detachable portion from said holding and guiding arrangement being exerted on said at least one detachable portion upon a container becoming substantially inhibited in its movement through said treatment machine;
   said holding and guiding arrangement comprises a plurality of container holders configured to hold a container;
   each of said container holders comprises said detachable portion;
   each of said container holders further comprises a base portion and a breakable portion disposed to connect said base portion and said detachable portion;
   said detachable portion is configured to receive and hold a container in a suspended position by a container flange;
   each of said detachable portions comprises a fork-shaped portion;
   said fork-shaped portion comprises a first arm and a second arm configured to hold containers there between;
   said breakable portion comprises a material web of a minimized thickness sufficient to permit breaking thereof upon a predetermined force being exerted on said fork-shaped portion, and sufficient to maintain said fork-shaped portion in an operating position upon a predetermined force not being exerted on said fork-shaped portion;
   said material web comprises a center portion and two narrowed portions extending therefrom;
   said two narrowed portions comprise:
      a first narrowed portion disposed to connect said first arm of said fork-shaped portion to said center portion;
      said first narrowed portion is configured to be broken to permit said first arm of said fork-shaped portion to break off upon a force sufficient to break said first narrowed portion being exerted on said first arm of said fork-shaped portion upon a container being held by said fork-shaped portion becoming substantially inhibited in its movement through said handling machine;
      a second narrowed portion disposed to connect said second arm of said fork-shaped portion to said center portion; and
      said second narrowed portion is configured to be broken to permit said second arm of said fork-shaped portion to break off upon a force sufficient to break said second narrowed portion being exerted on said second arm of said fork-shaped portion upon a container being held by said fork-shaped portion becoming substantially inhibited in its movement through said handling machine;
   each of said container holders has wedge-shaped recesses between said base portion and said fork-shaped portion to minimize the thickness of said breakable portion and to permit sufficient movement of said fork-shaped portion to permit breaking off of said fork-shaped portion from said base portion; and
   each of said container holders has a wedge-shaped recess between said first and second arms of said fork-shaped portion to minimize the thickness of said first and second narrowed portions and to permit sufficient movement of said first and second arms to permit breaking off of said first and second arms.

2. A container treatment machine configured to treat bottles or similar containers, such as blow-molded containers, said treatment machine comprising a holding and guiding arrangement configured to hold and guide containers through said treatment machine, said holding and guiding arrangement comprising:
   at least one detachable portion being configured to break away and at least partially detach from said holding and guiding arrangement upon a force sufficient to break away and at least partially detach said at least one detachable portion from said holding and guiding arrangement being exerted on said at least one detachable portion upon a container becoming substantially inhibited in its movement through said treatment machine;
   a plurality of container holders configured to hold a container;
   each of said container holders comprises said detachable portion;
   a stationary guide structure disposed adjacent said container holders and to surround a portion of the path of movement of said container holders;
   said stationary guide structure comprises displaceable segments configured to be displaced upon a force sufficient to displace said segments being exerted on at least one of said segments upon a container becoming substantially inhibited in its movement through said handling machine;
   said stationary guide structure comprises a stationary frame disposed to support said displaceable segments;
   said displaceable segments are held in an operating position on said stationary frame by a plurality of corresponding locking mechanisms; and
   each of said displaceable segments is configured to be displaced upon a force sufficient to overcome the locking force of its corresponding locking mechanism being exerted on said displaceable segment upon a container becoming substantially inhibited in its movement through said handling machine;
   each of said container holders further comprises a base portion and a breakable portion disposed to connect said base portion and said detachable portion;
   said detachable portion is configured to receive and hold a container in a suspended position by a container flange;
   each of said detachable portions comprises a fork-shaped portion;
   said fork-shaped portion comprises a first arm and a second arm configured to hold containers there between;
   said breakable portion comprises a material web of a minimized thickness sufficient to permit breaking thereof upon a predetermined force being exerted on said fork-shaped portion, and sufficient to maintain said detachable portion in an operating position upon a predetermined force not being exerted on said detachable portion;

said material web comprises a center portion and two narrowed portions extending therefrom;

said two narrowed portions comprise:

a first narrowed portion disposed to connect said first arm of said fork-shaped portion to said center portion;

said first narrowed portion is configured to be broken to permit said first arm of said fork-shaped portion to break off upon a force sufficient to break said first narrowed portion being exerted on said first arm of said fork-shaped portion upon a container being held by said fork-shaped portion becoming substantially inhibited in its movement through said handling machine;

a second narrowed portion disposed to connect said second arm of said fork-shaped portion to said center portion; and said second narrowed portion is configured to be broken to permit said second arm of said fork-shaped portion to break off upon a force sufficient to break said second narrowed portion being exerted on said second arm of said fork-shaped portion upon a container being held by said fork-shaped portion becoming substantially inhibited in its movement through said handling machine;

each of said container holders has wedge-shaped recesses between said base portion and said fork-shaped portion to minimize the thickness of said breakable portion and to permit sufficient movement of said fork-shaped portion to permit breaking off of said fork-shaped portion from said base portion; and each of said container holders has a wedge-shaped recess between said first and second arms of said fork-shaped portion to minimize the thickness of said first and second narrowed portions and to permit sufficient movement of said first and second arms to permit breaking off of said first and second arms.

3. A container treatment machine configured to treat bottles or similar containers, such as blow-molded containers, said treatment machine comprising a holding and guiding arrangement configured to hold and guide containers through said treatment machine, said holding and guiding arrangement comprising:

at least one detachable portion being configured to break away and at least partially detach from said holding and guiding arrangement upon a force sufficient to break away and at least partially detach said at least one detachable portion from said holding and guiding arrangement being exerted on said at least one detachable portion upon a container becoming substantially inhibited in its movement through said treatment machine;

a plurality of container holders configured to hold a container;

each of said container holders comprises said detachable portion;

a stationary guide structure comprises a stationary frame disposed to support displaceable segments;

each of said displaceable segments is connected to said stationary frame by a breakable structure;

each of said displaceable segments is configured to break away from said stationary frame upon a force sufficient to break away said displaceable segment from said stationary frame being exerted on said displaceable segment upon a container becoming substantially inhibited in its movement through said handling machine;

each of said breakable structures of said stationary guide structure comprises one of: at least one material web and at least one shearing bolt;

each of said container holders further comprises a base portion and a breakable portion disposed to connect said base portion and said detachable portion; and said breakable portion comprises a material web of a minimized thickness sufficient to permit breaking thereof upon a predetermined force being exerted on said detachable portion, and sufficient to maintain said detachable portion in an operating position upon a predetermined force not being exerted on said detachable portion.

said detachable portion is configured to receive and hold a container in a suspended position by a container flange;

each of said detachable portions comprises a fork-shaped portion;

said fork-shaped portion comprises a first arm and a second arm configured to hold containers there between;

said material web comprises a center portion and two narrowed portions extending therefrom;

said two narrowed portions comprise:

a first narrowed portion disposed to connect said first arm of said fork-shaped portion to said center portion;

said first narrowed portion is configured to be broken to permit said first arm of said fork-shaped portion to break off upon a force sufficient to break said first narrowed portion being exerted on said first arm of said fork-shaped portion upon a container being held by said fork-shaped portion becoming substantially inhibited in its movement through said handling machine;

a second narrowed portion disposed to connect said second arm of said fork-shaped portion to said center portion; and said second narrowed portion is configured to be broken to permit said second arm of said fork-shaped portion to break off upon a force sufficient to break said second narrowed portion being exerted on said second arm of said fork-shaped portion upon a container being held by said fork-shaped portion becoming substantially inhibited in its movement through said handling machine;

each of said container holders has wedge-shaped recesses between said base portion and said fork-shaped portion to minimize the thickness of said breakable portion and to permit sufficient movement of said fork-shaped portion to permit breaking off of said fork-shaped portion from said base portion; and each of said container holders has a wedge-shaped recess between said first and second arms of said fork-shaped portion to minimize the thickness of said first and second narrowed portions and to permit sufficient movement of said first and second arms to permit breaking off of said first and second arms.

* * * * *